United States Patent [19]

Bowman

[11] 4,356,007
[45] Oct. 26, 1982

[54] AUTOMATIC FILTER NETWORK PROTECTION, FAILURE DETECTION AND CORRECTION SYSTEM AND METHOD

[76] Inventor: Harold L. Bowman, Rte. #4, Box 1177, Pell City, Ala. 35125

[21] Appl. No.: 56,206

[22] Filed: Jul. 10, 1979

[51] Int. Cl.³ .............................................. B01D 46/00
[52] U.S. Cl. ........................................ 55/213; 55/309; 55/341 NT
[58] Field of Search ................... 210/323 T, 331–333, 210/90, 132, 134, 422; 73/40, 40.7; 55/341 NT, 293, 302, 309, 97, 270, 418, 420, 213, 313, 314, 18, 16, 158, 212; 137/517, 521, 856, 855, 857, 858

[56] References Cited

U.S. PATENT DOCUMENTS

| | | | |
|---|---|---|---|
| 2,327,181 | 8/1943 | Dunbar | 55/309 |
| 3,383,840 | 5/1968 | Johnson et al. | 210/323 T |
| 3,420,266 | 1/1969 | Downey | 210/90 |
| 3,434,486 | 3/1969 | Kasten | 210/100 |
| 3,712,114 | 1/1973 | Osborn | 55/270 |
| 3,865,561 | 2/1975 | Osborn | 55/270 |
| 3,876,402 | 4/1975 | Bundy et al. | 55/341 R |
| 3,877,899 | 5/1975 | Bundy et al. | 55/341 R |
| 3,996,961 | 12/1976 | Siegwart | 137/517 |
| 4,117,860 | 10/1978 | Carlin | 137/521 |
| 4,141,380 | 2/1979 | Lenk | 137/521 |
| 4,142,544 | 3/1979 | Straub | 137/517 |

*Primary Examiner*—Robert H. Spitzer
*Attorney, Agent, or Firm*—Laurence R. Brown

[57] ABSTRACT

This invention provides an automatic sensing and correction feature for each fabric type filter element in a filtering system with a multiplicity of separate filter elements, that operates when the filter develops a leak to take only an individual filter element out of service.

This is accomplished inexpensively by a simple flap closure valve array that senses increased fluid flow above a set threshold level and chokes off that flow through the individual defective filter cell.

7 Claims, 8 Drawing Figures

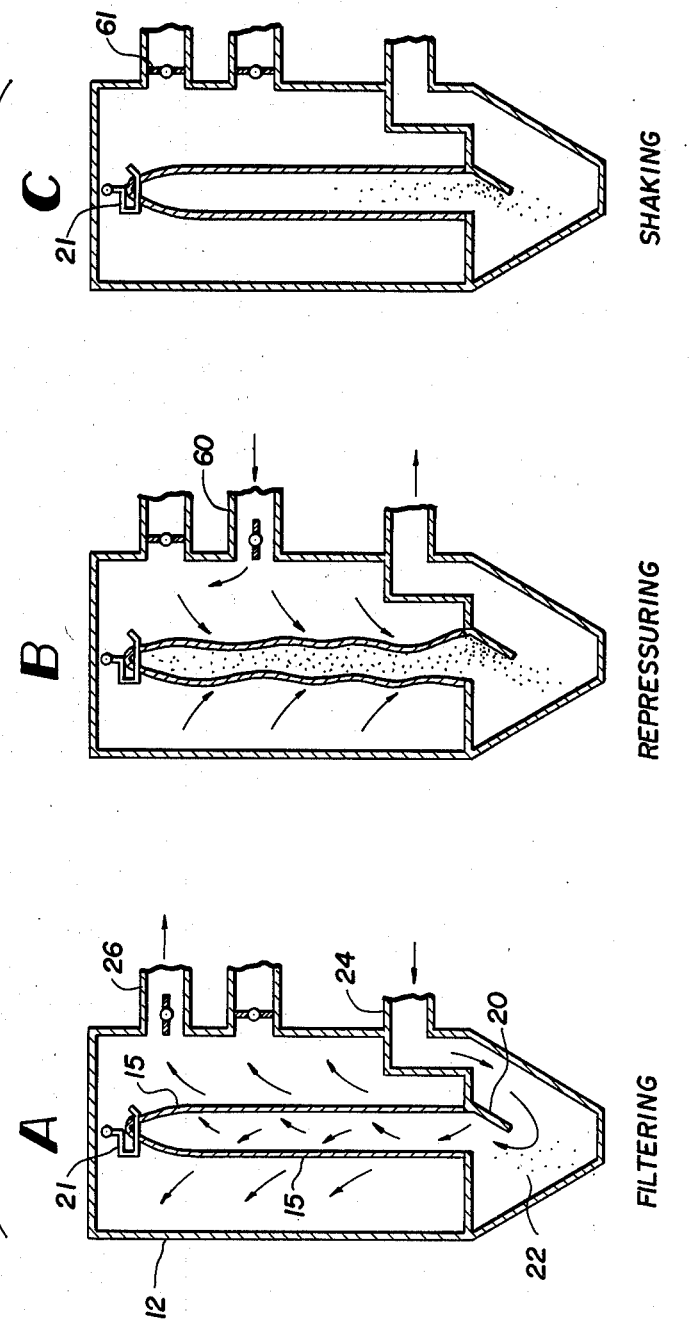

AUTOMATIC FILTER NETWORK PROTECTION, FAILURE DETECTION AND CORRECTION SYSTEM AND METHOD

TECHNICAL FIELD

This invention relates to fluid flow regulation in filtering networks using semi-permeable membranes or fabric filter materials and more particularly in such networks comprising a multiplicity of parallel connected fabric type filters inserted in a fluid flow path. In particular the invention provides for system protection by detecting operation conditions of individual filters and bypassing defective filters to prevent further progressive damage and system malfunction caused by failure of filters.

BACKGROUND ART

Filtering systems of the type using semi-permeable membranes hereinafter termed fabric type filters are well known in the art. The ordinary home vacuum cleaner is of this type. Essentially the same principle is involved in industrial filter systems. Fluids such as air or water are passed through the fabric to remove residual impurities and dirt.

Because of stiffer environmental protection standards, levels of water and air impurity tolerable in industrial plants are low. This requires more efficient, more effective and above all failproof filtering systems that cannot pollute the environment at a level above standards imposed by both Federal and State laws. Thus, it is essential to provide proper maintenance, failure detection and correction procedures in the operation of industrial systems.

Typical industrial systems having large volume of air flows through flues or boilers, for example, thus have adopted fabric type filter systems of the type illustrated, for example, in the following U.S. Patents:

Bundy et al. No. 3,876,402-Apr. 8, 1975
Reinauer No. 4,073,632-Feb. 14, 1978
Metro No. 2,952,332-Sept. 13, 1960

A typical large plant system in order to meet present standards would have to incorporate a large number of compartments of filters through which a large volume of polluted air is passed in parallel. Each compartment would have a plurality of closely positioned individual fabric filters typically of cylindrical construction with an open end into which the polluted air is passed. Preferably the air is passed upwardly so dirt and sediment can fall or be dislodged downwardly into a dirt receptacle or hopper common to all the filters of the compartment.

In these industrial systems the air flow volume is large and pressures and temperatures may be quite high. Thus, when one of the individual fabric filter elements fails such as by a tear or hole in the fabric, it rapidly increases in size and causes air jets and turbulence that establishes by a domino effect failure of the filters about it. Thus, all the filters of a compartment may fail because of a hole in one filter element. This is not only costly and time consuming to find and replace in a large system, but even worse is the possibility of exceeding pollution standards. Generally any failure is corrected by taking one compartment out of the system thereby reducing capacity.

Alternative preventive maintenance programs cannot always locate defects and are costly in terms of down time and reduced capacity. Thus, it is highly desirable to have some means of detecting failures.

Conventional failure detection means would consist of a monitor of the output flow of gases to show any significant variation of pollutants caused by filter failures. It sometimes takes hours to isolate the filters failing in a large flow system, and because of temperatures, pollution level, etc., it is sometimes necessary to close down the operation.

Detection of filter failures in the prior art are represented by the following U.S. Patents:

Hayes No. 3,960,001-June 1, 1976 which provides colored tracer materials in the input to be detected if they pass through and to show the routing to aid finding the filter defect position.

Osborn No. 3,712,114-Jan. 23, 1973 which uses an air flow meter inserted in each filter inlet opening to determine if that filter is defective.

It is clear that these techniques are unsatisfactory in a large scale industrial system in particular. Many defects can go unnoticed because of the large change of performance necessary before detection of a malfunction can occur from analysis of output air flow. Even after defects are detected they require manual programming and visual inspection which would take up to several hours or more to isolate trouble areas and the chances of inducing more damage or exceeding pollution limits would be high.

Also in the large scale systems now extensively in use there is the further problem that once a defect is found, it need be corrected by taking a compartment having a large number of tubes out of service, thereby significantly reducing system efficiency and capacity.

Thus, it is a general object of this invention to improve the prior art apparatus and methods of detecting defective filters.

Additionally, it is an objective to provide instantaneous detection of filter defects.

Further it is an object of the invention to have an automatic self-correction system feature operable on each individual filter so that a single filter is automatically bypassed upon failure and therefore eliminates the chances for a domino effect failure and does not substantially change the efficiency or flow rate of the filter system.

Other objects, features and advantages of the apparatus and method afforded by this invention are to be found throughout the following description and accompanying drawings.

BRIEF DISCLOSURE OF THE INVENTION

There is provided an automatic protection, failure detection and correction system for a fabric type filtering network processing polluted fluids such as air from an industrial plant, or the like.

Thus, each of a multiplicity of filter cells, generally of a cylindrical form, is sensed to detect an increased flow of fluid through that filter signifying a hole or leak in the filter fabric. Then responsive to this detected failure a valve arrangement serves to reduce the flow of fluid into the filter.

In a simpler preferred embodiment of the invention a flap valve at the inlet mouth of a cylindrical filter fabric element is itself the sensor and the valve latches shut in response to a fluid flow above an operational threshold, which may be adjusted.

BRIEF DESCRIPTION OF THE DRAWINGS

In the accompanying drawings:

FIG. 8 is an operational sketch exploded to show separate operational conditions of a filter compartment consistent with the present invention.

DETAILED DESCRIPTION OF PREFERRED EMBODIMENTS

Figure 1:
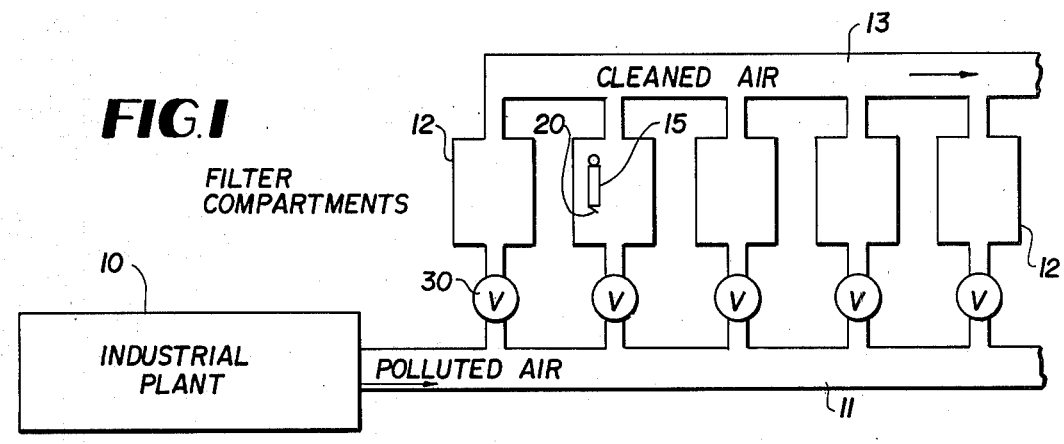
FIG. 1 is a block schematic diagram of an industrial plant air cleaning system embodying the invention.

As may be seen from FIG. 1, a typical installation in which the invention is employed is the air filter system of an industrial plant 10 which has polluted air flowing out of the plant through piping 11. Because of a large volume of air flow and very strict anti-pollution regulations, a large number of filter compartments 12, operating in parallel serve to process the polluted air and transfer it to cleaned air discharge pipe 13. Within each of the filter compartments is a plurality of separate filters which may be of the tubular fabric filter type 15 as shown more clearly in FIGS. 2 to 5. In accordance with this invention the filters are fitted with flow control valve means 20 operable to take the filter out of stream if the fabric filter develops a hole.

A typical compartment 12 has a plurality of generally cylindrical filters 15 suspended by means 21 permitting them to be shaken for dislodging into hopper 22 sediment and dirt taken out of the air by the fabric filter walls 23. Polluted air enters into the lower plenum by way of entranceway 24 into the hopper 22, and cleaned air exits from the upper plenum 25 by exit pipe 26 after passing through the fabric lining 23 of filters 15.

Figure 2:
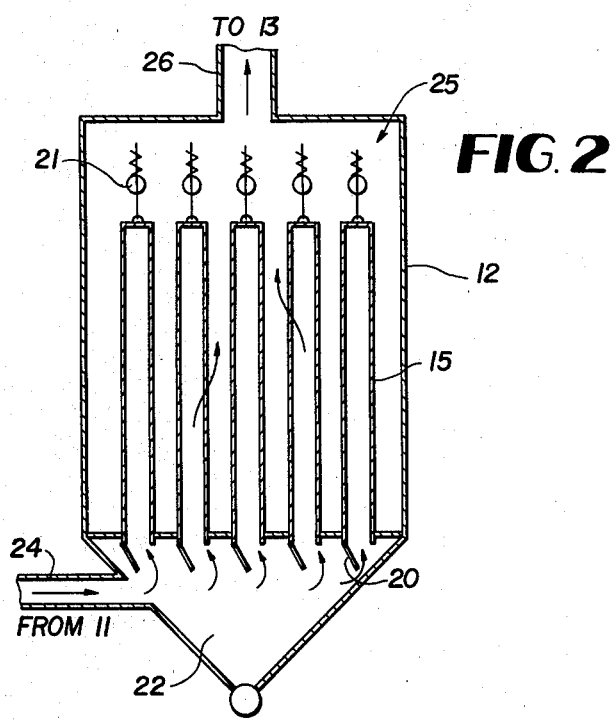
FIG. 2 is a diagrammatic sketch of a filter compartment embodying the invention.

It can be seen from joint consideration of FIGS. 1 and 2 that if the fabric 23 of one cylindrical filter cell 15 develops a hole, the very high pressure input air flow at generally very high temperatures since the air comes from boilers and flues in general, will tend to cause a domino failure effect in the closely spaced filter elements 15 within compartment 12.

Conventional practice in the prior art would be to monitor the output air of pipe 13 and if the filter system fails to meet the prescribed standards to monitor in turn each filter compartment 12 until a defective one is found and to take it off line by means of a control valve 30. This takes considerable time and cost and then reduces the filter system capacity by a large incremental step.

The present invention therefore serves to automatically isolate each single filter cell element 15 within a compartment 12 and automatically close or choke off the flow path through only that element if the flow therethrough increases above a threshold level set to show an improper air flow because of a hole in the fabric 23.

Figure 3:
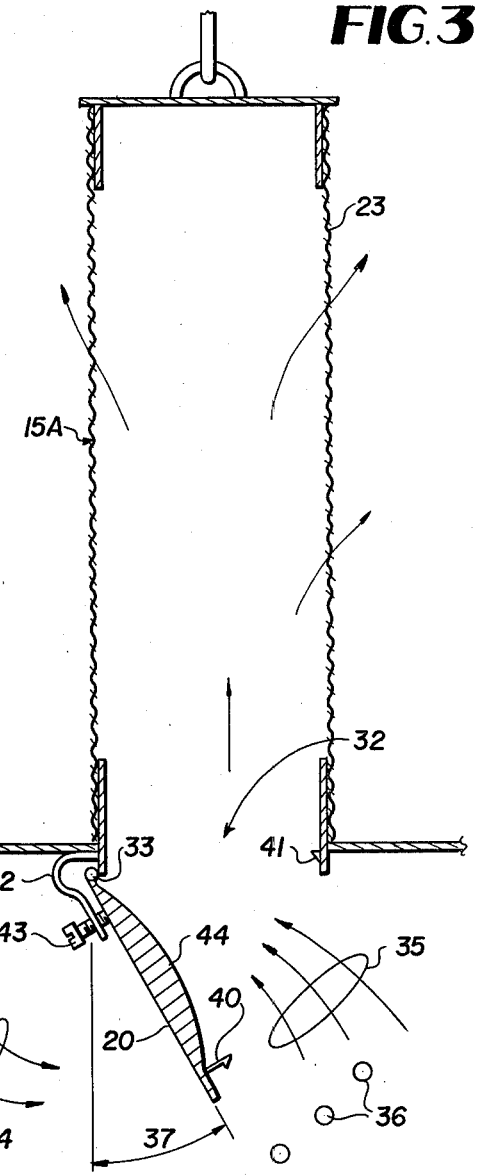
FIG. 3 is an elevation view in section of a filter tube embodying the invention.
Figure 4:
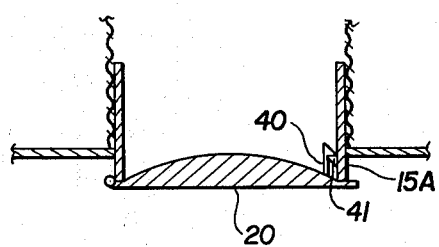
FIG. 4 is a partial elevation view of the filter tube of FIG. 3 in a different operating condition.

Although various detection means for an abnormally large air flow through each filter element could be employed and various types of valves might be operated when the abnormal air flow is detected, the preferred embodiment of the invention shown in FIGS. 2, 3 and 4 is simple and inexpensive.

Thus, in the filter cylinder 15A arrows show the air flow path into and out of the cylinder. Since the fabric 23 will provide a resistance to air flow, when a hole develops a greater flow of air results. It is this greater flow into the filter at the open mouth 32 of the cylinder 15 that is detected.

A flap valve 20 is hinged 33 at one side of the cylinder mouth 32 and hangs downwardly by gravity or as aided by a tension spring in the hinge 33 if necessary depending upon weight of the flap and pressures involved in a particular system.

Preferably air is directed inwardly at 34 so that it needs to curve around the end of flap valve 20 before entry into the filter at 35. This gives the advantage of separation of dirt particles 36 by centrifugal force action so that they can settle into hopper 22.

The weight and/or spring force on the flap valve 20 and the angle 37 is chosen to set the threshold and sensitivity of the flap 20 to be its own detector of increased air flow and thus close as seen in FIG. 4 if the air flow into the cylinder 15A exceeds a threshold value. Note that latching elements 40, 41 provide for taking the filter element out of service until repairs are made by replacing a cylindrical fabric 23 section for example. However, a single filter element does not give any significant reduction to the system capacity as explained in connection with FIG. 1.

A simple threshold adjustment on flap valve 20 can be made by bracket 42 and set screw 43 which adjusts the angle 47. Also the surface 44 may be bowed for better aerodynamic lift in the presence of the air stream 35. It is clear, however, that other types of valves such as butterfly valves and axially guided valve closures can be used. Also, if tight seals are desired at high temperatures silicone gaskets may be mounted on the flap or cylinder where the contact is made. Also the same principle can be used in filter systems using other fluids such as water.

Figure 6:
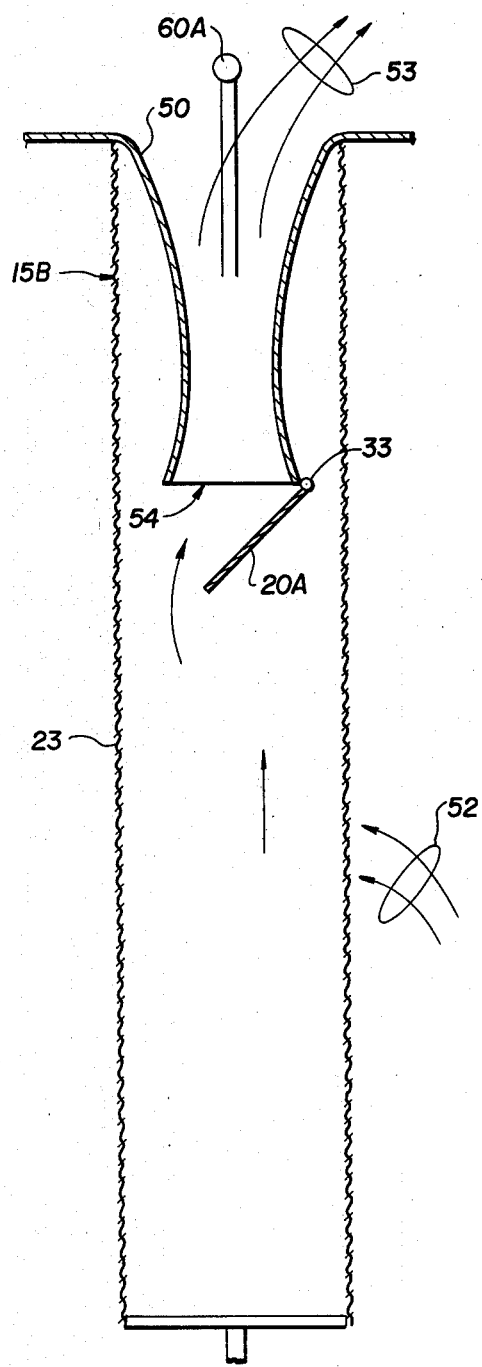
FIG. 6 is a filter element in elevation cross section as employed in the filter compartment of FIG. 5.
Figure 5:
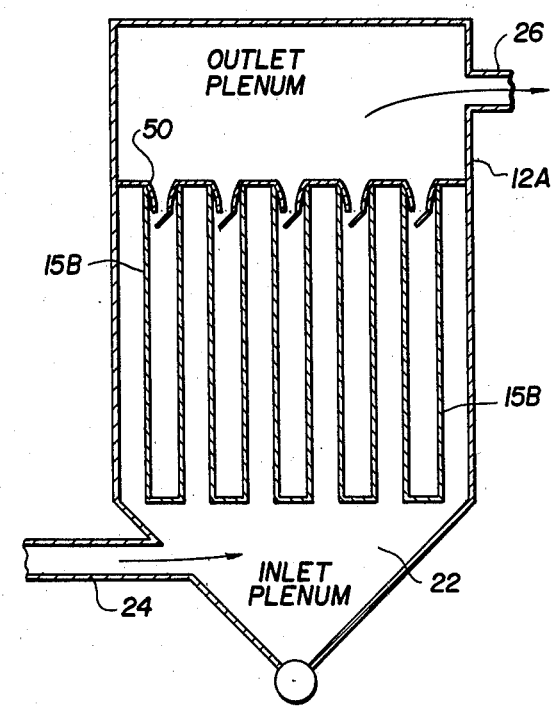
FIG. 5 is a diagrammatic sketch of a further embodiment of filter compartment embodying the invention.

For other filter configurations such as shown in FIGS. 5 and 6 the same operational principles and steps are taken, namely the air flow is sensed for each filter at the air output end and upon exceeding a threshold flow value a valve is controlled to choke off air flow at least sufficiently to prevent catastrophic failure and passage of any significant quantities of polluted air.

In this configuration of FIGS. 5 and 6, the air exits upwardly through the inside of the cylindrical filter element 15B, that is it passes through the fabric 23 and filter 15B in the opposite direction. The input air 52 then passes through fabric 23 and exits upwardly at 53.

A venturi tube 50 at the upper exit end thus has a mouth 54 at which flap valve 20A is placed to operate in the manner aforesaid in response to the exit flow of air from the filter cylinder 15B.

Figure 7:
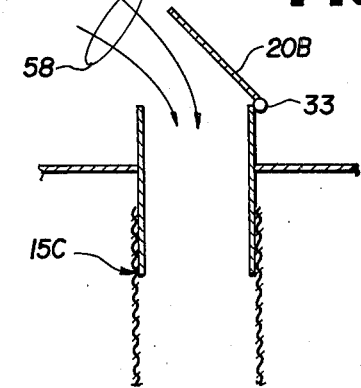
FIG. 7 is a further filter element embodiment of the invention in fragmentary elevation cross section.

As shown in FIG. 7, the flap valve 20B may be simply a valve plate biased upwardly by a coil spring in the hinge 33 until the threshold flow of air 58 downwardly into filter 15C is exceeded, when the flap valve 20B closes.

As may be seen from FIG. 8 the invention does not interfere with the cleaning cycles of the filters which are used to dislodge the accumulated dirt on the filters into the hoppers 22.

The filter compartments 12 are supplied with means 60 including a control valve to produce a back flow of clean gas to knock off the dirt from the fabric of filter cells 15 as one cleaning mode shown in FIG. 8B. The same principle is used by the jet 60A in FIG. 6, where a pulse of back flow air is used to break away accumulated dirt and sediment.

Thus, the filter compartment also has a damper valve control means 61 that prevents the back flow of clean gas into valve 60 from exiting at the outlet pipe 26.

Additionally, a mechanical vibration of the filters may dislodge particles by the means 21.

In each of these cleaning instances of FIGS. 8B and 8C it is seen that flap valve 20 does not interfere and operation during the normal filtering cycle 8A is as aforesaid.

It is to be noted that a plant can be kept in service by this invention at nearly full capacity until a regular closed down is scheduled, and then repairs can be made simply and inexpensively upon visual inspection into the hoppers to see which flap valves are latched and to replace only those filter elements.

Thus, it is evident that this invention has advanced the state of the art by providing simple and effective automatic means for sensing failure of filter elements and correcting the failure by bypassing a filter element and taking it off line thereby to protect the system against both catastrophic domino effect failure of more elements and passage of polluted air into the output.

Accordingly, those novel features believed descriptive of the nature and spirit of the invention are defined with particularity in the claims.

INDUSTRIAL APPLICATION

A semi-permeable membrane type filter system such as used to depollute air from boilers in an industrial plant is provided with inexpensive control valves for each separate filter element to take it out of service automatically if it springs a leak and passes polluted air. This (1) reduces preventive maintenance to take out older filters that might be subject to failure, (2) reduces system down time by permitting operation with only loss of capacity through a very small percentage of the filtering network, and (3) repair time by signifying the failed filter elements for easy identification and replacement.

I claim:

1. An automatic filtering network protection, failure detection and correction system comprising a plurality of fabric cell type filters in said network and means processing a fluid flow path through the plurality of filters in parallel, including individual filter tube valves operable responsive to any increased fluid flow through the corresponding filter cell caused by a hole in the fabric filter of that cell, wherein the valves are fitted to control flow of fluid through the individual cells in a normally open position and operate to choke off fluid to a corresponding tubular filter in response to said increased fluid flow caused by a fabric failure.

2. The system defined in claim 1 wherein the valves latch in a closed position cutting off air flow in response to said increased air flow, thereby to take defective ones of said plurality of filters out of said system automatically when failure occurs without interruption of fluid flow through the system and marking the defective filters for maintenance and repair when the system is shut down.

3. The system defined in claim 1 wherein the cells are tubular in shape with an entrance opening for receiving fluid therein and the valves comprise flap valves pivoted at said entrance opening.

4. The system defined in claim 3 wherein a plurality of the cells are located in a compartment above a dirt collecting hopper through which fluid is passed to said entrance openings of the tubes, and said flap valve is arranged at said opening to cause the fluid to make a sharp turn before entrance to the tube opening, thereby to cause dirt from the fluid to be centrifugally separated from the fluid for deposit in said hopper.

5. A system as defined in claim 1 having a plurality of multi-filter compartments connected in parallel, each compartment comprising a plurality of tubular fabric filter cells having only a bottom opening for receiving fluid into said tubular filters and a dirt collecting lower hopper for receiving collectively the fall out dirt from each tubular filter, wherein the valves comprise latching valves for each tubular filter opening that close the fluid path into that filter tube when operated by said increased air flow.

6. The combination of a membrane type filter having an inlet for flow of fluids therethrough and a valve closing the inlet responsive to an increase in fluid flow through the membrane above a predetermined operating threshold level signifying a rupture of the membrane.

7. The combination defined in claim 6 including means coupled to the valve adjustable to select the operating threshold level.

* * * * *